US010459957B2

(12) United States Patent
Zomet et al.

(10) Patent No.: US 10,459,957 B2
(45) Date of Patent: Oct. 29, 2019

(54) USER-GUIDED TERM SUGGESTIONS

(71) Applicant: Google Inc., Mountain View, CA (US)

(72) Inventors: Asaf Zomet, Jerusalem (IL); Gal Chechik, Los Altos, CA (US); Michael Shynar, Kiryat Ono (IL)

(73) Assignee: GOOGLE LLC, Mountain View, CA (US)

( * ) Notice: Subject to any disclaimer, the term of this patent is extended or adjusted under 35 U.S.C. 154(b) by 362 days.

(21) Appl. No.: 15/394,564

(22) Filed: Dec. 29, 2016

(65) Prior Publication Data

US 2017/0109433 A1  Apr. 20, 2017

Related U.S. Application Data

(63) Continuation of application No. 13/829,591, filed on Mar. 14, 2013, now abandoned.

(51) Int. Cl.
*G06F 16/33* (2019.01)
*G06F 16/332* (2019.01)
*G06F 16/9032* (2019.01)
*G06F 17/27* (2006.01)
*G06F 3/023* (2006.01)
(Continued)

(52) U.S. Cl.
CPC ........ *G06F 16/3323* (2019.01); *G06F 3/0237* (2013.01); *G06F 16/3344* (2019.01); *G06F 16/90324* (2019.01); *G06F 17/24* (2013.01); *G06F 17/273* (2013.01); *G06F 17/276* (2013.01); *G06F 3/0482* (2013.01); *G06F 3/04886* (2013.01)

(58) Field of Classification Search
CPC ............ G06F 16/3323; G06F 16/3344; G06F 16/90324
See application file for complete search history.

(56) References Cited

U.S. PATENT DOCUMENTS 5,442,736 A    8/1995  Cummins
6,005,549 A   12/1999  Forest
(Continued)

FOREIGN PATENT DOCUMENTS

EP         2575009         4/2013

OTHER PUBLICATIONS

Darren Redfern, "The Matlab 5 Handbook", Springer, 1998, 487 pages.*

(Continued)

*Primary Examiner* — Loc Tran
(74) *Attorney, Agent, or Firm* — Middleton Reutlinger

(57) ABSTRACT

Methods and apparatus related to providing user-guided term suggestions. Some implementations may be directed to identifying user input that includes at least one term and identifying a user-initiated activity near the term. An edit term may be identified based on the user-initiated activity near the term, an edit position in the edit term may be identified, and one or more candidate terms may be identified based on the edit term. Similarity measures for the candidate terms may be determined. The similarity measure of a given candidate term of the candidate terms may be based on the edit position. One or more of the candidate terms may be selected as suggested terms based on the similarity measures and the selected suggested terms provided for potential replacement of the edit term.

6 Claims, 7 Drawing Sheets

(51) Int. Cl.
*G06F 17/24* (2006.01)
*G06F 3/0482* (2013.01)
*G06F 3/0488* (2013.01)

(56) References Cited

U.S. PATENT DOCUMENTS

| | | |
|---|---|---|
| 7,792,838 B2 | 9/2010 | Ranganathan et al. |
| 8,290,772 B1 | 10/2012 | Cohen et al. |
| 8,577,913 B1 | 11/2013 | Hansson et al. |
| 2007/0079239 A1 | 4/2007 | Ghassabian |
| 2008/0316212 A1* | 12/2008 | Kushler ................. G06F 3/0482 345/467 |
| 2011/0239153 A1 | 9/2011 | Carter et al. |
| 2013/0290338 A1* | 10/2013 | Lee ....................... G06F 16/285 707/739 |

OTHER PUBLICATIONS

PCT Search Report and Invitation to Pay Additional Fees for corresponding PCT Application No. PCT/US2014/025037, dated Jul. 23, 2014.

International Search Report and Written Opinion of PCT Serial No. PCT/US14/25037, dated Oct. 28, 2014.

Redfern, Darren. "The Matlab 5 Handbook," Springer Science & Business Media, 1998, 488 pages.

* cited by examiner

200

210

400 410 420

| Term 1 | Term 2 | Term 3 | Term 4 | Term 5 | Term 6 | Term 7 | Term 8 | Term 9 | Term 10 |

430

USER-GUIDED TERM SUGGESTIONS

BACKGROUND

This specification is directed generally to identifying one or more suggested terms based on user-initiated activity at or near a given term and, more particularly, to providing suggested terms to replace the given term, where the suggested terms may be responsive to the user-initiated activity.

When a misspelled term is entered in a user-editable document, one or more systems such as a spell-correction system may provide spell-corrected suggestions to the user. These spell-corrected suggestions may be identified based on a mapping between the misspelled term and the spell-corrected suggestions.

SUMMARY

The present disclosure is directed to methods and apparatus for providing one or more suggested terms for a given term based on user-initiated activity at or near the given term. For example, some implementations may be directed to providing spell-corrected terms based on user-initiated activity at or near the given term. Also, for example, some implementations may be additionally and/or alternatively directed to providing modified terms, alternative terms, and/or augmented terms based on user-initiated activity at or near the given term. The identification of the suggested terms, when responsive to the user-initiated activity, may increase the relevance of the suggested terms to the user-initiated activity. For example, user-initiated activity at different portions of the same given term may lead to the identification of different suggested terms.

In some implementations a computer implemented method may be provided that includes the steps of: identifying user input that includes at least one term; identifying a user-initiated activity near the at least one term; identifying an edit term of the at least one term based on the user-initiated activity near the at least one term; identifying an edit position in the edit term; identifying one or more candidate terms based on the edit term; determining similarity measures for the candidate terms, wherein the similarity measure of a given candidate term of the candidate terms is based on the edit position; selecting one or more of the candidate terms as suggested terms based on the similarity measures; and providing the selected suggested terms for potential replacement of the edit term.

This method and other implementations of technology disclosed herein may each optionally include one or more of the following features.

The at least one of the candidate terms may be identified based on the edit position. The method may further include identifying the user-initiated activity based on one or more of detecting a user selection in the display and detecting a cursor position in the display. The method may further include identifying the user-initiated activity based on comparison of time duration of the user selection or the cursor position to a time threshold. The time threshold may be inversely proportional to one or more of an area size covered by the user-initiated activity, a number of terms within the area covered by the user-initiated activity, a screen size, a screen resolution, and a font size.

The edit position may include a single position and the single position may be identified when the user-initiated activity is directly adjacent to a single character in the edit term.

The number of characters in the edit position may be inversely proportional to one or more of a size of the edit term, a screen size, a screen resolution, and a font size.

The similarity measure for the given candidate term may be based on an edit similarity score. The edit similarity score may be indicative of the difference between the edit term and the given candidate term near the edit position. The edit similarity score may optionally be a real number between zero and one. For example, the edit similarity score may equal one if the candidate term differs from the edit term by the replacement, addition, or deletion of one or more characters in the edit position, and the edit similarity score may equal zero otherwise. The similarity measure for the given candidate term may be based on multiplying the similarity measure with the edit similarity score.

The edit position may be identified based on the user-initiated activity.

The similarity measure for the given candidate term may be further based on one or more of popularity of the given candidate term, relevance of the given candidate term to the edit term, historical edits using the given candidate term, and contextual usage of the edit term.

The method may further include: identifying an edit area corresponding to the user-initiated activity; identifying a set of the terms within the edit area; determining a relevance score for each term in the set of the terms, wherein the relevance score for each term is based on a likelihood of replacing the term; and selecting the edit term from the set of the terms based on the relevance score. Identifying the edit area may be based on one or more of an area size covered by the user-initiated activity, a number of the terms within the area covered by the user-initiated activity, a screen size, a screen resolution, and a font size.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein process data to identify user-initiated activity at or near a user-editable field. The data may be utilized by one or more edit term identification engines to identify an edit term, an edit position, and to select one or more suggested terms as potential replacements for the edit term based on the edit position. The selection of these suggested terms as potential replacements based on the edit position represents new aspects of the suggested terms. Particular implementations of the subject matter described herein may additionally and/or alternatively utilize supplied data to identify candidate terms based on the edit term, and apply additional selection criteria based on the edit position to select one or more of these candidate terms as suggested terms for the edit term. Particular implementations of the subject matter described herein may additionally and/or alternatively utilize supplied data to determine the suggested terms based on a likelihood of replacing, modifying, augmenting and/or alternatively replacing the edit term.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

DETAILED DESCRIPTION

Figure 1:
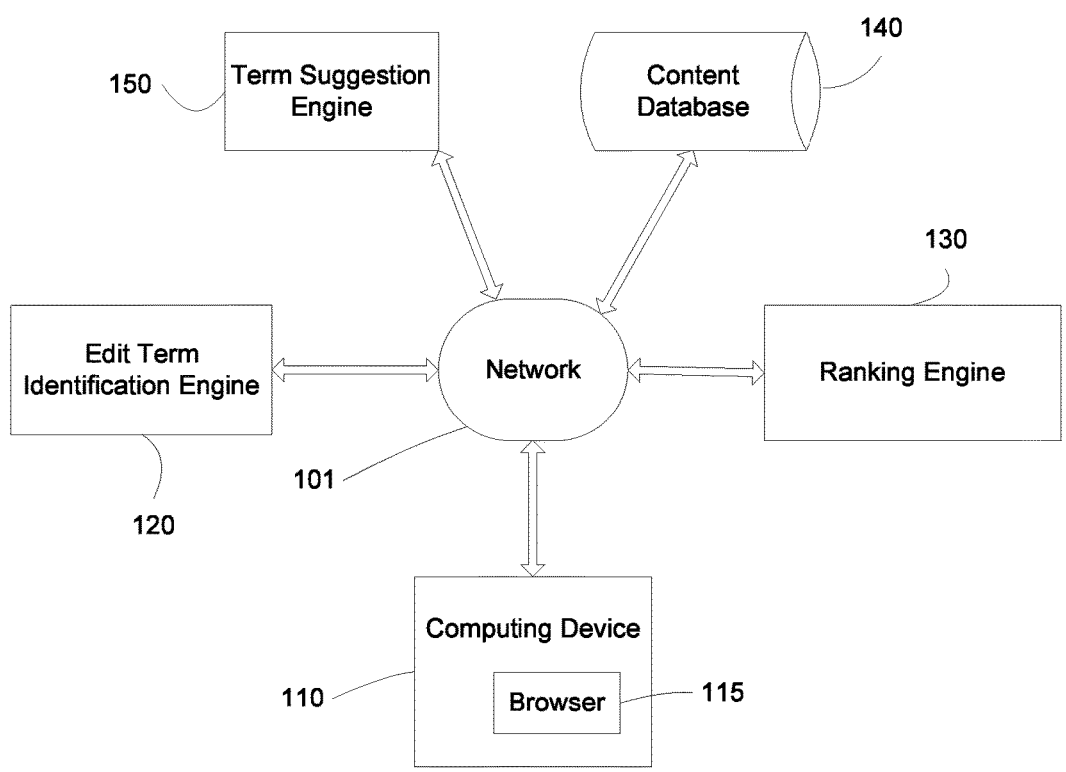
FIG. 1 is a block diagram of an example environment in which a suggested term may be determined in response to a user-guided identification.

FIG. 1 illustrates a block diagram of an example environment 100 in which a suggested term may be determined in response to a user-guided identification. The example environment 100 may include a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 may also include a computing device 110, edit term identification engine 120, a ranking engine 130, a content database 140, and a term suggestion engine 150.

One or more components of the example environment 100 may be utilized to provide one or more suggested terms for a given term based on user-initiated activity at or near the given term. For example, some implementations may be directed to providing spell-corrected terms based on user-initiated activity at or near the given term. Also, for example, some implementations may be additionally and/or alternatively directed to providing modified terms, alternative terms, and/or augmented terms based on user-initiated activity at or near the given term. The identification of the suggested terms, when responsive to the user-initiated activity, may increase the relevance of the suggested terms to the user-initiated activity. For example, user-initiated activity at different portions of the same given term may lead to the identification of different suggested terms.

A user may input text including one or more terms, in a user-editable field displayed on a client computing device 110. For example, a user may input text that includes a term "surden", which may be displayed, for example, on the screen of a mobile device. Conventional spell-correction systems may suggest replacements, but these suggestions may not be based on user-initiated activity at or near "surden". The user may initiate activity to correct the term "surden" by interacting with a portion of the display that displays the term. For example, if the user positions a cursor after "s", then "burden" may be suggested as a replacement for "surden". If, on the other hand, the user positions a cursor after "r", then "sudden" may be suggested as a replacement for "surden".

The terms entered by the user may include, for example, words or n-gram sequences of words, phrases, concepts, numbers, codes that mix numbers and letters, misspellings, typos, characters, groups of words used to identify a distinct concept, and/or any groups including one or more of these or additional types of terms. After entering one or more terms, the user may attempt to edit a portion of an entered term.

User input that includes at least one term may be identified via one or more components of environment 100. For example, user input may be identified by the computing device 110. User input may include at least one term.

In some implementations, the computing device 110 may identify a user-initiated activity near the at least one term. For example, the user-initiated activity identified by the computing device 110 may be identified via receiving information from one or more user interface input devices regarding the user-initiated activity.

In some implementations, the user-initiated activity may be based on one or more of detecting a user selection in the display and detecting a cursor position in the display. For example, the user-initiated activity may include activities such as a user click near a character; positioning a cursor at or near an entered term without modifying the term; highlighting and/or selecting all or portions of one or more of the entered terms without modifying the terms; touching a portion of a touch-sensitive screen displaying the term; and/or hovering over one or more entered terms for at least a threshold amount of time. User-initiated activities may also include deletions of one or more characters from a term and/or additions of one or more characters to a term.

In some implementations the pointing or selection may be accomplished via a user's finger, a stylus, a mouse, the use of a touch-sensitive display, and/or a touchpad. In some implementations, identifying a user-initiated activity near the entered terms may include detecting the positioning of a cursor at or near an entered term without modifying the term, and/or detecting the hovering over one or more entered terms for at least a threshold of time. The edit term identification engine 120 may receive information about the user-initiated activity or activities from the computing device 110.

The edit term identification engine 120 may identify an edit term from the at least one term based on the user-initiated activity near the at least one term. For example, the edit term may be one or more of the entered terms that are most likely to be replaced with a replacement term. A replacement term may include a spell-correction, modification, augmentation and/or an alternative replacement of one of the entered terms.

The edit term may include one or more terms. For example, the edit term may be a single term "concur" or phrases like "New York", "such as", "such that", "comprising of", "In addition to" and "cinco de mayo".

In some implementations the computing device 110 may detect user-initiated activity including a user click at a position, movement of the cursor to a position, or user touch at a position. The computing device 110 may provide information including the position, one or more characters adjacent to the position, and/or the term at or near the position, to the edit term identification engine 120. In some implementations, the information provided may also include one or more terms near the identified term, and/or one or more characters near the identified position. The meaning of "near" can vary from implementation to implementation. In some implementations, "near" may include terms that are "adjacent to" the user identified term. In some implementations, "near" may include terms that are "above and/or below" the user identified term. In some implementations, "near" may be based on a pixel distance on a screen. In some implementations, "near" may be based on an identified co-relation or co-occurrence of two terms within the user-editable document.

As another example, the computing device 110 may detect user-initiated activity including highlighting and/or selecting a portion of the text. The computing device 110 may provide information that includes the highlighted and/or selected portion of the text, to the edit term identification engine 120. In some implementations, the information provided may also include a portion of the text near the highlighted and/or selected text.

For example, a user may input "may include the hih-lighted and/or selected portion of the text" and user may highlight the portion "hihlighted and/or selected". The computing device 110 may provide the highlighted portion "hihlighted and/or selected", and/or provide "hihlighted and/or selected portion" to the edit term identification engine 120. In some implementations, additional terms may be included to provide context. In some implementations additional terms may include terms that are likely to be replaced. In some implementations not all selected terms may be provided to the edit term identification engine 120.

Also, for example, when the user-initiated activity includes a hovering movement, the computing device 110 may provide information that includes one or more terms within an area near the hovering movement. For example, a user may input "may include the highlighted and/or seected portion of the text", a user's finger may hover over "seected", and the computing device 110 may provide the term "seected" and/or provide the terms "seected portion" to the edit term identification engine 120. In some implementations additional terms may be added to provide context and/or to include terms that are likely to be replaced.

In some implementations identifying and/or detecting the user-initiated activity may be based on a comparison of time duration of a user-initiated action to a time threshold. For example, if the user moves and positions a cursor over a term, and pauses for at least a time threshold, for example, to enter or delete one or more characters, such activity may be identified as user-initiated activity. As another example, when the user clicks at or near a character and within a time threshold, the user clicks at or near a different character, the first click may be determined to not be a user-initiated activity based on the short time interval between the two clicks. If a time threshold is satisfied with the second click, the second click may be utilized to identify an edit term and an edit position.

In some implementations the time threshold may be inversely proportional to one or more of an area size covered by the user-initiated activity, a number of terms within the area covered by the user-initiated activity, a screen size, a screen resolution, and a font size. For example, when the font size is large, it may be easier for the user to locate an edit term and an edit position. In such an instance, a shorter time threshold may apply. Also, for example, when the font size is small, it may be more difficult for the user to place a cursor to identify an edit term and/or an edit position within a threshold of accuracy. In such an instance, a longer time threshold may apply.

In some implementations the time threshold may be inversely proportional to the screen size. For example, a screen for a mobile device is smaller than a screen for a desktop monitor. It may be easier for a user to edit a portion of a term on a desktop monitor. In such an instance, a shorter time threshold may apply. Also, for example, it may be more difficult for the user to edit a portion of a term on the screen for a mobile device. In such an instance, a longer time threshold may apply. Data utilized to determine the time threshold may optionally be identified in the content database 140. In this specification, the term "database" will be used broadly to refer to any collection of data. The data of the database does not need to be structured in any particular way, or structured at all, and it can be stored on storage devices in one or more locations. Thus, for example, the content database 140 may include multiple collections of data, each of which may be organized and accessed differently.

In some implementations the edit term identification engine 120 may identify an edit position in the edit term. For example, an edit position may include one or more characters within the edit term; a position between two characters in the edit term; a position at the beginning of the edit term; a position at the end of the edit term; and/or a position near the edit term. The edit position may be identified based on the user-initiated activity. The edit position is a portion of the edit term that is indicative of one or more characters that are likely to be modified when the edit term is replaced.

The edit position may, in some implementations, be identified based on a likelihood of replacement of one or more characters. In some implementations, the edit position may be the edit term itself. In some implementations, the characters in an edit position may be those that are identified as most likely to be modified when the edit term is replaced. For example, if the term "delver" is typed, then the edit position may be identified as "l"; "v"; the position between "l" and "v"; "e"; "r"; "lv"; "er" and/or the position after "r".

The edit term identification engine 120 may identify the edit position based on the user-initiated activity. In some implementations, the edit position may include a single position and the single position may be identified when the user-initiated activity is directly adjacent to a single character in the edit term, or the user-initiated activity is between two characters in the edit term. For example, in the term "delver", if the cursor is positioned next to "l", then "l", and/or the position between "l" and "v" may be identified as the edit position.

In some implementations one or more characters may be identified as an edit position when the cursor position is within or directly adjacent to a term in the user-edited text. For example, in the term "delver", if the cursor is positioned next to "l", then "l", "v", and/or the position between "l" and "v" may be identified as the edit position. Likewise, if the cursor is positioned next to "r", then "r" and "e" and/or the position between "e" and "r" may be identified as the edit position.

The edit position may be additionally and/or alternatively identified based on one or more characters that have been deleted. For example, if user inputs "delver" and deletes "r" then the position after "e" may be identified as the edit position. In such an instance, the edit term identification engine 120 may additionally receive information about the one or more deleted characters.

In some implementations the number of characters in the edit position may be inversely proportional to one or more of a size of the edit term, a screen size, a screen resolution, and a font size. For example, when the screen size, screen resolution, and/or the font size are small, the user's margin of error in identifying the edit term and/or the edit position may be increased. In such instances, the edit position may include a larger number of characters.

As another example, the number of characters in the edit position may be inversely proportional to the screen size. For example, a screen for a mobile device is smaller than a screen for a desktop monitor. It may be easier for a user to identify an edit position on a desktop monitor. In such an instance, fewer characters may be needed to identify the edit position. Also, for example, it may be more difficult for the user to identify an edit position on the screen for a mobile device. In such an instance, a larger number of characters may be needed to identify the edit position.

When the user-initiated activity identifies a position within the edit term, the edit position may optionally be identified more narrowly. For example, if the cursor is positioned between "a" and "l", then the edit position may be identified as the position between "a" and "l". As another example, if the user selects "sal", the edit position may be identified as "sal". Upon identifying an edit term and an edit position, the edit term identification engine 120 may provide these to the term suggestion engine 150.

The term suggestion engine 150 may identify one or more candidate terms based on the edit term. Candidate terms are potential suggested terms to replace the edit term.

In some implementations the edit position may be utilized to identify and/or rank the candidate terms. For example, candidate terms may be identified by including all terms that differ from the edit term by the replacement, addition, and/or deletion of one character at or near the edit position. For example, user may input "delver". If the edit position is identified as the position between "l" and "v", the candidate terms may be identified to include "deliver", "delivers", "delivery", "deliveries" and "delivered". Likewise, if the edit position is identified as the position after "r", the candidate terms may be identified to include "delve", "delves", and "delved".

In some implementations the identified candidate terms may be optionally selected based on user input. For example, the term suggestion engine 150 may optionally include a statistically based module such as a language module that may determine that "delivery", "deliveries", and "delivered" are not relevant replacements based on syntax of "delver".

Additional and/or alternative techniques of selecting the candidate terms based on the edit term may be utilized, such as those discussed herein. For example, context based algorithms can assess the likelihood of misspelling even if the term is in a dictionary of a language model, but is likely misspelled based on its use in the context of the surrounding terms. For example, the edit term identification engine 120 may identify the edit term to be "slte" and the edit position to be the position between "l" and "t". The edit term identification engine 120 may additionally identify the context of the text to be referring to restaurant menus. In this example, the term suggestion engine 150 may identify a candidate term "plate" in addition to a candidate term "slate". In some implementations the context-based similarity score for "plate" may be higher than that for "slate" based on the context. Accordingly, the similarity measure for "plate" may be higher than the similarity measure for "slate".

In some implementations term suggestion engine 150 may optionally include a spell-correct module that provides candidate terms for spell-correcting the edit term. Spell-correcting may include applying pattern matching algorithms and/or context based analysis that may determine what the likely intended term is in a given context of terms. For example, user may select "aerica" in the text "ask not what aerica can do for you". The edit term identification engine 120 may identify the edit term to be "aerica" and the term suggestion engine 150 may identify "America" as a candidate term based on the context.

As another example, the term suggestion engine 150 may identify candidate terms using rule-based methods, such as methods based on inflections, commonly misspelled words, and/or similarity key techniques.

Additionally and/or alternatively, the candidate term may be identified based on the likelihood of co-occurrence of the edit term and the candidate term over a collection of documents. In some implementations these documents may be internet-based documents such as html documents and/or PDF documents. In some implementations the collection of documents may be a collection linked to the user and stored in a database such as, for example, the content database 140. In some implementations the collection of documents may be additionally and/or alternatively stored in a cache on the computing device 110.

Also, for example, the term suggestion engine 150 may additionally and/or alternatively use conventional or other techniques to determine which terms to select as candidate terms. For example, the term suggestion engine 150 may use prefix-based matching, and/or suffix-based matching to select candidate terms based on the edit term. In some implementations candidate terms may be identified to replace one valid term with another valid term. For example, "then" may be identified as a candidate term for the edit term "than".

As another example, the term suggestion engine 150 may identify candidate terms that may be conceptually distinct from the edit term. For example, the candidate term may be an alternative or related term or phrase. Also, for example, the candidate term may be semantically distinct from the edit term. In some implementations a stemming algorithm, such as the "porter stemming" algorithm may be used to determine semantic distinctiveness, and semantically related candidate terms may be filtered out or otherwise removed.

Additionally and/or alternatively, candidate terms may be identified based on past user activity, and/or a log of past activity by groups of users. For example, content database 140 may include a log of historical user activity. Historical user activity may indicate one or more terms that are likely to be replaced and/or likely replacements for those terms. For example, terms having a higher frequency of replacement may be stored in content database 140, along with their respective frequencies. Content database 140 may include data regarding documents edited and/or terms from those documents that were replaced. The data in content database 140 may be anonymized so as not to be traceable to a particular user and/or a particular document.

In some implementations the content database 140 may optionally include time stamp data and session identification data that facilitate grouping of documents, users, computing devices, and/or locations of users and/or devices. In some implementations the content database 140 may only include historical data having selection rates or historical occurrences above a predetermined threshold. Additional restrictions may optionally apply such as the exclusion of black-listed terms, and/or the exclusion of edit terms not replaced by more than a predetermined number of users. The content database 140 may be collectively stored in one or more computers and/or storage devices.

The term suggestion engine 150 may determine similarity measures for the candidate terms. The similarity measure of a given candidate term of the candidate terms may be based on the edit position. For example, the similarity measure may be indicative of the likelihood of replacing the edit term with the candidate term based on the edit position. Accordingly, the similarity measure for a candidate term may vary depending on the edit position in the edit term.

In some implementations the similarity measure for the given candidate term may be based on an edit similarity score. The edit similarity score may be indicative of the difference between the edit term and the given candidate term near the edit position. In some implementations a sensitivity measure may be utilized to determine nearness to the edit position. For example, the sensitivity measure may be set to a distance of one character from the edit position. For example, if the edit position in the term "delver" is identified as the position between "l" and "v", then the sensitivity measure may be set to, for example, one character. Accordingly, the edit similarity score may be determined based on the addition of one character between "l" and "v", and the deletion and/or replacement of "l" and/or "v". As another example, if the sensitivity measure is set to two characters, the edit similarity score may be determined based on the addition of two characters between "l" and "v", the deletion and/or replacement of "el" and/or "ve", etc.

In some implementations the edit similarity score may be a real number. For example, the edit similarity score may be a value between zero and one. For example, the edit similarity score for candidate terms may be weighted between zero and one based on one or more criteria to indicate their edit distance from the edit position.

In some implementations the edit similarity score equals one if the candidate term differs from the edit term by the replacement, addition, or deletion of one or more characters at the edit position, and the edit similarity score equals zero otherwise. In the example above, S ("delver", "delve", position between "l" and "v")=0, whereas S ("delver", "deliver", position between "l" and "v")=1, where S ($W_1$, $W_2$, L) is the edit similarity score between the edit term $W_1$ and the candidate term $W_2$ at the edit position L.

In some implementations, the edit similarity score may be based on the edit position. For example, if the edit position is identified as the position between "l" and "v", the edit similarity scores for the identified candidate terms related to "deliver", such as "deliver", "delivers", "delivery" and "delivered", will be higher than the edit similarity scores for the candidate terms "delve", "delves", and "delved". On the other hand, where a higher edit similarity score is more indicative of similarity, if the edit position L is identified as the position after "r", the edit similarity scores for the identified candidate terms related to "delve", such as "delve", "delves", and "delved", will be higher than the edit similarity scores for the terms "deliver", "delivers", "delivery" and "delivered".

For example, in the example above, the respective similarity measures for the identified candidate terms related to "deliver", such as "deliver", "delivers", "delivery" and "delivered", will be more indicative of similarity than the respective similarity measures for the candidate terms "delve", "delves", and "delved". On the other hand, if the edit position L is identified as the position after "r", the edit similarity scores for similarity measures of the terms related to "delve", such as "delve", "delves", and "delved", will be more indicative of similarity than the similarity measures for the terms "deliver", "delivers", "delivery" and "delivered".

In some implementations the similarity measure for the candidate term may be adjusted by multiplying the similarity measure with the edit similarity score.

For example, in the previous example, if L were to denote the position between "l" and "v", S ("delver", "delve", L)=0. Accordingly:

N ("delve")×S ("delver", "delve", L)=0.

On the other hand, S ("delver", "deliver", L)=1. Accordingly,

N ("deliver")×S ("delver", "deliver", L)=N ("deliver"), resulting in an elevated similarity measure for "deliver", and a lower similarity measure for "delve". Here N (W) is the similarity measure for the candidate term W. In some implementations "delve" may not be provided as a suggested term to the user due to adjusted similarity measure for "delve" being zero.

In some implementations, the similarity measure for the given candidate term may be further based on one or more of popularity of the given candidate term, relevance of the given candidate term to the edit term, historical edits using the given candidate term, and contextual usage of the edit term. The similarity measure may be based one or more techniques of identifying the candidate terms, such as those discussed herein.

In some implementations the similarity measure may be based on popularity of the given candidate term. For example, the similarity measure may be more indicative of similarity if the candidate term is a popular term.

In some implementations the similarity measure may be based on historical edits using the given candidate term. For example, the similarity measure for a candidate term may be more indicative of similarity if there is an indication that users who input the edit term subsequently corrected to the candidate term. For example, if the input term is "acordingly" then it is likely that a majority of the users may subsequently spell-correct it to "accordingly".

In some implementations the similarity measure may be based on relevance of the given candidate term to the edit term. For example, the similarity measure may be based on the likelihood of co-occurrence of the edit term and the candidate term over a collection of documents.

In some implementations the similarity measure may be based on the contextual usage of the edit term, including, for example, measures based on identifying a semantic similarity score, a context-based matching score, and statistical term frequencies. When using rule-based methods, such as methods based on inflections, commonly misspelled words, or similarity key techniques, the similarity measure in such instances may be based on statistical probabilities such as transition probabilities and/or confusion probabilities. Transition probability estimates the likelihood of going from one letter to the next. Confusion probability estimates the likelihood of one letter being mistaken. Additional and/or alternative techniques may be used to determine the similarity measure.

Additionally and/or alternatively, the similarity measure for the candidate term may be based on the similarities and/or dissimilarities between the edit term and the candidate term. For example, one or more measures of similarity may be utilized to determine if a similarity threshold between the candidate term and the edit term is met.

In some implementations one or more candidate terms may be identified based on the edit term, and the similarity measure for the candidate term may be adjusted based on the edit position. Additionally and/or alternatively, in some implementations one or more candidate terms may be identified based on the edit position and the similarity measure for the candidate term may be adjusted based on the edit term.

Figure 2:
FIG. 2 illustrates an example of identifying candidate terms based on a layout of characters in a keyboard.

FIG. 2 illustrates an example method of identifying candidate terms based on a layout of characters in a keyboard 200. In some implementations candidate terms may be identified based on the identified edit term and the identified edit position by using characters on the keyboard that are adjacent to or near the characters in the edit position. This may occur, for example, when a touch-sensitive display is used on a mobile phone and the user, while entering text, touches a character adjacent to or near a character that the user intended to touch. In another example, the user may touch the character lightly and the character may not appear in the entered text. For example, if the entered term is "caring" and user-initiated activity indicates user intent to replace "caring" then the user may have entered the character "r" instead of the character "s" by touching the incorrect character. Also, for example, the user may have intended to type "carting" by touching "t" after entering "r" but the character "t" was never displayed in the text due, for instance, to a lighter user touch. In this example, it may be noted that "caring" is a proper word and is not inherently misspelt. However, user-initiated activity, such as placement of a cursor or a mouse click may indicate user intent to edit the term "caring". In such an instance, "caring" may be identified as the edit term and the position after "r" may be identified as the edit position. A portion of keyboard 200 may be identified using the character or characters in the edit position. In some implementations, keyboard 200 may be identified to correspond with the keyboard utilized by the user in entering the term. In this example, characters near "r" on keyboard 200 may be identified and portion 210 of the keyboard may be identified by including one or more characters from the list of adjacent characters on the keyboard, such as "3, 4, 5, e, r, t, y, s, d, f". Candidate terms may be identified based on the criterion that they differ from the edit term by the replacement of one or more characters in the edit position with one or more characters that are from portion 210 of the keyboard. In this example, terms including "carring", "caring", "carting", "carding", "caging", "carying" and "casing" may be identified as candidate terms.

In some implementations the misspelled candidate terms may be spell-corrected. Accordingly, terms including "carrying" may be identified as a candidate term, and "carring" and "carrying" may no longer be identified as candidate terms. In some implementations portion 210 may be extended, for example, to additionally include character "v". Accordingly, terms including "carving", "craving", "caving", and "cave in" may be additionally identified as candidate terms. One or more of these candidate terms may be provided to the term suggestion engine 150 and/or the ranking engine 130. In some implementations similarity measures may be determined for these candidate terms. Additionally and/or alternatively these candidate terms may be directly provided to the user.

In some implementations one or more suggested terms may be selected from the one or more candidate terms based on the respective similarity measures. For example, the term suggestion engine 150 may provide the candidate terms to the ranking engine 130 and the ranking engine 130 may facilitate the selection of suggested terms that are to be provided to the user. The ranking engine 130 may receive candidate terms from the term suggestion engine 150, rank them based on the similarity measures, and return the ranked list to the term suggestion engine 150. The term suggestion engine 150 may select one or more of the suggested terms from the one or more candidate terms.

In some implementations, the term suggestion engine 150 may determine that some candidate terms are not relevant to user intent and eliminate these candidate terms from further consideration. For example, the term suggestion engine 150 may determine that not all the candidate terms are logical, useful, or valid suggestions, and may eliminate those that are not. Also, for example, the term suggestion engine 150 may query the content database 140 and exclude some candidate terms if they have not resulted in past selection by users. This exclusion may be based on some predetermined threshold. Such exclusion helps to avoid providing suggested terms that have historically been of little interest to users.

In some implementations, the term suggestion engine 150 may provide the one or more suggested terms as a replacement of the edit term. For example, the suggested terms may be provided to a user via a computing device 110. In some implementations the suggested terms may be presented within the user-editable field as a menu option; presented as a pop-up window; presented as a drop-down menu; and/or may appear in a box. The box may be positioned anywhere on the display, such as a side panel or overlaid onto the user-editable document. In some implementations the suggested terms may become visible as user-initiated activity is detected near an edit term, and/or an edit area. In some implementations the number of suggested terms displayed may depend on the computing device 110. For example, fewer suggested terms may be displayed on a mobile device than may be displayed on a desktop device. In some implementations the computing device 110 may receive the suggested terms from the term suggestion engine 150 and may display them in an application, such as a browser 115. The user may then select a suggested term and the computing device 110 may replace the edit term with the suggested term.

Figure 3A:
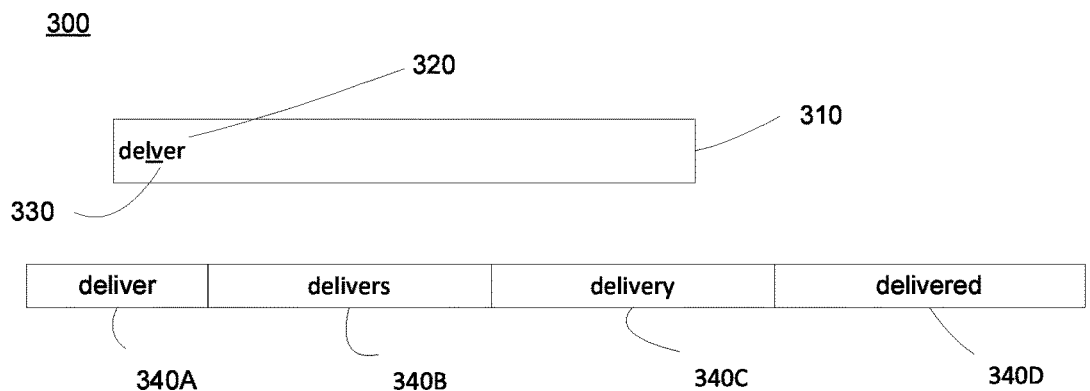
FIG. 3A illustrates an example of providing suggested terms for display that are responsive to an edit term and an edit position.

FIG. 3A illustrates an example of providing suggested terms responsive to an edit term and an edit position, as provided, for example, by the term suggestion engine 150. A user-editable field 310 is shown on a display 300. Display 300 may be, for example, a touch-sensitive screen on a mobile device. For example, the user-editable field 310 may be a search query box. User-initiated activity may identify "delver" as the edit term 320 and/or may additionally identify the position between "l" and "v" as the edit position 330. In some implementations the term suggestion engine 150 may, for example, identify "deliver", "delivery", "delivers", and "delivered" as candidate terms. Each candidate term differs from the edit term at the edit position by the addition of a single character "i". Accordingly, in some implementations the edit similarity scores between each candidate term and the edit term at the edit position may be one. The similarity measure for each candidate term may be based, for example, on how many additional characters are added to "delver" to obtain the candidate term. A larger number may correspond to a similarity measure less indicative of similarity. In this example, the similarity measures for "deliver", "delivery", "delivers", and "delivered" may be determined as 1, 2, 2, and 3 respectively. In some implementations one or more additional ranking methods may be utilized to differentiate between two terms with the same similarity measure. For example, based on a lexicographical ordering, a higher similarity measure may be associated with "delivers" than with "delivery". In some implementations the term suggestion engine 150 may provide the candidate terms to the ranking engine 130. The ranking engine 130 may rank the candidate terms based on the similarity measures and return a ranked list such as "deliver", "delivers", "delivery", "delivered" to the term suggestion engine 150. The suggested terms may be displayed on display 300 in ranked order. For example, the first ranked candidate term 340A is "deliver", the second ranked candidate term 340B is "delivers", the third ranked candidate term 340C is "delivery", and the fourth ranked candidate term 340D is "delivered". The user may indicate selection of a suggested term by, for example, clicking on the suggested term. If the user clicks on the term "delivery" 340C then the edit term "delver" may be replaced by the suggested term "delivery".

Figure 3B:
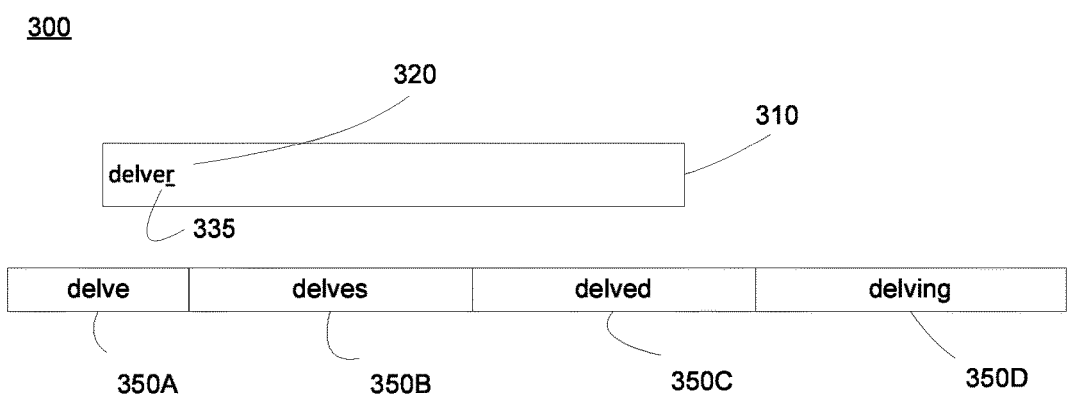
FIG. 3B illustrates another example of providing suggested terms for display that are responsive to an edit term and an edit position.

FIG. 3B illustrates another example of providing suggested terms responsive to an edit term and an edit position, as provided, for example, by the term suggestion engine 150. A user-editable field 310 is shown on a display 300. Display 300 may be, for example, a touch-sensitive screen on a mobile device. For example, the user-editable field 310 may be a search query box. User-initiated activity may identify "delver" as the edit term 320. In this example, the user may additionally identify "r" as the edit position 335. The term suggestion engine 150 may, for example, identify "delve", "delved", "delves", and "delving" as candidate terms. The ranking engine 130 may rank the candidate terms based on the similarity measures and return a ranked list, as for example, "delve", "delves", "delved", "delving" to the term suggestion engine 150. The suggested terms may be displayed on display 300 in ranked order. For example, the first ranked candidate term 350A is "delve", the second ranked candidate term 350B is "delves", the third ranked candidate term 350C is "delved", and the fourth ranked candidate term 350D is "delving". As illustrated here, the ranking may be based on a similarity measure different from lexicographical ordering.

In some implementations the user may select a suggested term to replace the edit term. In some implementations the user may choose to ignore the suggested terms and may leave the edit term unaltered. In some implementations the user may offer his replacement of the edit term. In some implementations the contents of a database such as the content database 140 may be updated with data related to user selections. In some implementations, the term suggestion engine 150 may provide data related to user selections to the content database 140.

In some implementations an edit term may not be identifiable based solely on user-initiated activity. For example, in a touch-sensitive display, the user's finger may touch and/or hover over more than one term. In another example, the user may highlight several terms within the text. This situation may occur for instance when the screen size and/or font size may be small and/or the user is unable to clearly identify an edit term. In such instances, an edit term may be identified based on an edit area. An edit area is a portion of the user input text that is identified based on user-initiated activity and is identified as likely to contain an edit term and an edit position.

For example, an edit area on the screen may correspond to the user-initiated activity. For example, when a user touches the screen with a finger, the edit area may include the text in the area of the screen covered by the finger. Also, for example, if the user hovers over an area of the text using a mouse, or using a finger in a touch-sensitive display, the edit area may include text in the area covered by such hovering activity. Also, for example, if the user circles a portion of the text, then the edit area may include the circled text. The edit term identification engine 120 may identify one or more terms in the user-editable field as being part of an edit area.

In some implementations, the edit area may be based on one or more of an area size covered by the user-initiated activity, a number of the terms within the area covered by the user-initiated activity, a screen size, a screen resolution, and a font size. For example, the user may input text within the display of a smartphone, and then touch the touch-sensitive screen of the smartphone to identify a portion of the text. Depending on factors including the size of the screen, the font size, and the density of the typed text, the user-initiated activity may identify areas of different sizes as an edit area. For example, if the density of typed text is high, the edit area may contain a larger number of terms. As another example, the size of the user's finger, or the use of a stylus may affect the size and position of the edit area. In some implementations a device with a touch-sensitive display may indicate a confidence level to identify confidence that a determination of a user selection of an area is the correct area and the edit area may be based on such a confidence level.

In some implementations the edit area may be identified to be larger than the area covered by the user-initiated activity. For example, the edit area may include one or more lines of text above and/or below and/or to the left and/or to right of the portion of the text identified by the user-initiated activity. In some implementations this identification may be based on anonymized logs of past user-initiated activity. For example, the logs of past user activity may indicate that the user identified one area of the text, but selected a term outside the identified area. Anonymous logs may be queried, for example, from the content database 140, and this information may be utilized to identify the edit area. One or more terms may be included in the edit area. The identified edit area may include some terms that are partially included by the edit area. For example, in the text "our guarantee is that we can delver goods" the edit area may include "an delver". In such an instance, "can" and "delver" may be identified as the terms in the edit area.

In some implementations the edit area may be a contiguous area. In some implementations the edit area may include one or more terms that are separated by terms that are not included in the edit area. For example, correctly spelled and syntactically correct common terms such as "a", "an", "the", "and", may not be included among the terms in the edit area.

The edit term identification engine 120 may identify information related to an edit area. The identified information may include one or more terms within the edit area. The edit term identification engine 120 may identify the terms, and provide them to the ranking engine 130.

In some implementations the ranking engine 130 may facilitate the selection of an edit term within an edit area. The ranking engine 130 may receive a set of terms from the edit term identification engine 120, and determine a relevance score for each term in the set of terms. The relevance score for each term is based on a likelihood of replacing the term. The relevance score may be based on one or more criteria such as criteria described in detail below. The ranking engine 130 may rank the terms based on the relevance scores.

In some implementations the edit term may be selected from the set of terms based on the relevance score. For example, the ranking engine 130 may rank the terms in the set of terms based on the relevance scores, and provide the ranked list to the edit term identification engine 120. The edit term identification engine 120 may select an edit term based on the ranking. For example, the edit term identification engine 120 may select an edit term based on the relevance scores.

Figures 4, 5:
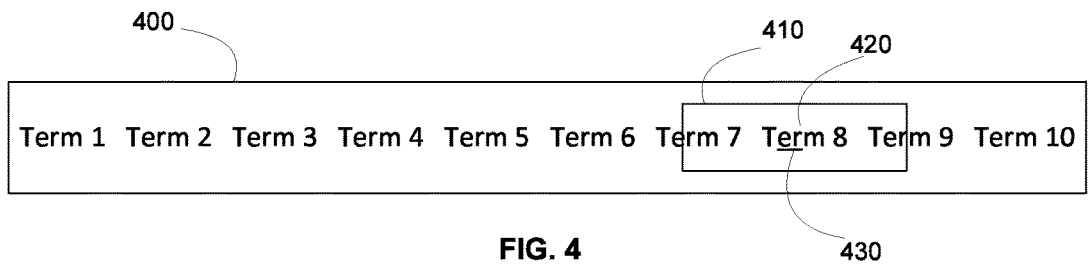
FIG. 4 illustrates an example of a user-editable field where an edit term and an edit position may be identified.
FIG. 5 illustrates another example of a user-editable field where an edit term and an edit position may be identified.

FIG. 4 illustrates an example of a user-editable field where an edit term and an edit position may be identified by the edit term identification engine 120 with the aid of the ranking engine 130. A user-editable field, such as a search query box 400, may be identified. Search query box 400 includes a sequence of terms, "Term 1" through "Term 10". Edit term identification engine 120 may identify an edit area 410 based on user-initiated activity, such as hovering using a cursor, or hovering with a finger via a touch-sensitive screen. The edit term identification engine 120 may identify the initial edit area as "rm 7 Term 8 Ter", and enlarge the edit area to include "Term 7 Term 8 Term 9". The edit term identification engine 120 may provide the terms within the edit area to the ranking engine 130. The ranking engine 130 may determine relevance scores for each of the three terms, rank the terms based on their relevance scores, and provide the ranked list to the edit term identification engine 120. The edit term identification engine 120 may identify Term 8 as the edit term 420 based on the ranking of the terms.

In some implementations edit area 410 may coincide with edit term 420. For example, the user may highlight "Term 8". In this example, the edit term identification engine 120 may identify the edit term and edit area as "Term 8". In some implementations edit area 410 may include only a portion of the edit term 420. For example, the user may position the cursor between characters "e" and "r" of "Term 8". In such an instance, the edit term identification engine 120 may identify the edit term 420 and the edit area 410 as "Term 8". Furthermore, the edit term identification engine 120 may identify the position between "e" and "r" as the edit position 430. For example, the ranking engine 130 may rank the list of terms received from the edit term identification engine 120 based on a database of terms such as the content database 140.

In some implementations, the ranking engine 130 may determine a relevance score for each term in the list of terms. The relevance score for each term may be based on a likelihood of replacing the term. In some implementations the likelihood of replacing the term in the at least one term may be based on a likelihood of misspelling the term.

In some implementations the ranking engine 130 may include a spell-check application that flags terms in a document or other term strings that may be misspelled. A spell-check application may be stand-alone and capable of operating on a block or string of text, or as part of a larger application, such as a word processor, email client, electronic dictionary, or search engine. The spell-check application may include a set of spell-check routines that can scan the text or string of terms and can extract the individual terms and compare the terms against a language database. In some implementations, the language database may be included in the content database 110. The language database may include stored common phrases, statistical word frequency data, and/or context based algorithms with other associated statistical information.

In some implementations the likelihood of misspelling the at least one term may be based on an identified frequency of the term. The ranking engine 130 may determine a relevance score for the likelihood of a term being misspelled based on statistical term frequency data and/or based on context based algorithms and/or other associated statistical data. The ranking engine 130 may determine the probability that a term may appear in a text based on the frequency of the term in a collection of words, phrases, and/or documents found in the language database. The scanning routines of the spell-check application may include language dependent algorithms for handling term structure and morphology.

In some implementations, the ranking engine 130 may include a statistically based module such as a character n-gram module. A character n-gram module may determine the likelihood of a character n-gram. A character n-gram may include a sequence of characters occurring in a given language. An n-gram module models a language at the character level, e.g., rather than looking at the likelihood of a particular term appearing in a given context, the n-gram model looks at the likelihood of a n-length sequence of characters, e.g., an n-gram, occurring. The model looks at the statistical probability of the sequence of characters occurring in the language. The ranking engine 130 may determine a relevance score for the term based on the statistical probability. For example, the lower the probability, the higher the relevance score assigned to the term. The ranking engine 130 may look at both the statistical frequency of the n-gram as well as whether the n-gram is likely possible or likely impossible in a given language and the ranking engine 130 may determine a relevance score based on this determination.

In some implementations, the relevance score may be based on a likelihood of modifying and/or augmenting the respective terms. For example, the ranking engine 130 may include a term augmentation system that determines whether one or more terms may be likely to be modified and/or augmented and returns a ranked list of likely terms to the ranking engine 130.

The ranking engine 130 may return the ranked list of terms to the edit term identification engine 120, which then selects the edit term or terms based on the ranking. In some implementations, the edit term may be selected as the term with the highest ranking.

In some implementations the ranking engine 130 may determine a relevance score for one or more multi-term phrases within the identified edit area. The relevance scores may be used to rank the contents of the edit area in order to identify an edit term. In some implementations, after an initial ranking of a multi-term phrase, the ranking engine 130 may break the multi-term phrase into smaller term segments. The ranking engine 130 may determine relevance scores for the smaller term segments. This relevance scoring may occur when the relevance score for the multi-term phrase is determined to not reach a predetermined threshold. In some implementations the relevance scores for the smaller term segments are compared to the relevance score for the multi-term phrase to further rank the contents of the edit area. The terms, term segments and/or multi-term phrases are ranked by the ranking engine 130 and provided to the edit term identification engine 120. In some implementations the ranking engine 130 may only provide terms, term segments, and/or multi-term phrases that have relevance scores higher than a predetermined threshold value. In some implementations the edit term identification engine 120 may receive the ranked list of terms, term segments and/or multi-term phrases and select the term, term segment and/or multi-term phrase with the highest relevance score as the edit term.

In some implementations an edit term based on relevance scores may not be identified based on an initial edit area. For example, the edit term identification engine 120 may identify an edit area, and fail to identify an edit term based on relevance scores. This may occur, for instance when the screen size and/or font size is small and the edit area identified by the user-initiated activity does not contain any terms likely to be replaced. In such instances, the edit term identification engine 120 may modify the initial edit area to include additional terms to identify a term likely to be replaced.

In some implementations the edit term identification engine 120 may modify the edit area to include misspelled terms that are adjacent to, or near the edit area. For example, the edit term identification engine 120 may access a spell-correction system that determines whether one or more terms near the initial edit area may be misspelled. The spell-correction system may provide a ranked list of likely misspelled terms to the edit term identification engine 120. This may enable the edit term identification engine 120 to modify the edit area to include potential edit terms.

As another example, the edit term identification engine 120 may include terms above, below, to the right and/or to the left of the identified initial edit area. In some implementations such terms may be included based on their likelihood of being misspelled.

In some implementations the edit term identification engine 120 may determine that some input terms are not logical, contextually useful, or valid terms, and may not identify such terms as potential edit terms.

In some implementations the edit term identification engine 120 may query the content database 140 and may include some terms that have resulted in past modifications by the user, or by users in a community of users. This inclusion may be based on some determined threshold. Such inclusion may help to include terms that have historically been of greater interest to users.

FIG. 5 illustrates another example of a user-editable field where an edit term may be identified from an edit area. A portion of text 500 is entered by the user in the user-editable field. User-initiated activity, for example, initiated via a user's finger touching or hovering over a touch-sensitive screen, identifies an edit area 510. The edit term identification engine 120 may enlarge the edit area 510 and may identify the terms within edit area 510 as "as", "phrases", "such", "caring", "having", "holding", "composed", "to" and "be". The edit term identification engine 120 may provide these terms to the ranking engine 130. The ranking engine 130 may rank these terms based on their relevance scores. In this example, all the included terms are correctly spelled. In some implementations the ranking engine 130 may eliminate some terms from further consideration based on their relevance scores. For example, lower relevance scores may be associated with the terms "as", "such", "to" and "be" based on their correct spellings and/or based on context. The ranking engine 130 may optionally eliminate these terms from further consideration based on their lower relevance scores. In this example, "having", "holding", and "composed" may share a semantic similarity because each term refers to "containing something". The ranking engine 130 may associate lower relevance scores with the terms "having", "holding", and "composed" based on their semantic similarities and correct spellings. The ranking engine 130 may associate higher relevance scores with the terms "phrases" and "caring", which are semantically different from "having", "holding", and "composed". In some implementations the ranking engine 130 may additionally use context based similarities to differentiate between "phrases" and "caring" and may associate a higher relevance score with "caring" than with "phrases". The ranking engine 130 may provide the ranked terms to the edit term identification engine 120. Based on the ranking, the edit term identification engine 120 may identify "caring" as the edit term 520.

In some implementations the edit term identification engine 120 may additionally include the phrase "transitional phrases" and "composed of" among the terms in the edit area. In such an instance, "having", "holding", "composed of", and "transitional phrases" share a semantic similarity because "having", "holding", and "composed of" are transitional phrases. The ranking engine 130 may associate a higher relevance score with "caring" based on its semantic dissimilarity with the other terms in the edit area. The ranking engine 130 may provide the ranked terms to the edit term identification engine 120. Based on the ranking, the edit term identification engine 120 may identify "caring" as the edit term 520.

In some implementations an edit position may not be identifiable based solely on user-initiated activity. For example, in a touch-sensitive display, the user's finger may touch and/or hover over more than one character within an edit term. As another example, the user may highlight several characters within the edit term. This situation may occur for instance when the screen size and/or font size may be small and/or the user is unable to clearly identify an edit position.

In some implementations the edit term identification engine 120 may provide the edit term to the ranking engine 130. In some implementations the ranking engine 130 may utilize the character n-gram module to identify the edit position. For example, the ranking engine 130 may determine the respective statistical probabilities of various combinations of the sequence of characters occurring in the edit term. For example, if the edit term is "gard", the ranking engine 130 may identify the combinations of the sequence of characters as "ga", "gar", "ar", "ard", and "rd" and determine the probabilities of each combination of the sequence of characters to occur in the edit term "gard". The ranking engine 130 may utilize these probabilities to rank the combinations of the sequence of characters, and provide the ranked list to the edit term identification engine 120. The edit term identification engine 120 may select an edit position based on the ranking.

For example, the lower the probability, the higher the likelihood of getting selected as an edit position. The ranking engine 130 may look at both the statistical frequency of the sequence of characters as well as whether the sequence of characters is likely possible or likely impossible in a given language. The ranking engine 130 may utilize this information to rank the various combinations of characters, and provide the ranked list to the edit term identification engine 120. The edit term identification engine 120 may select an edit position based on the ranking.

Figure 6:
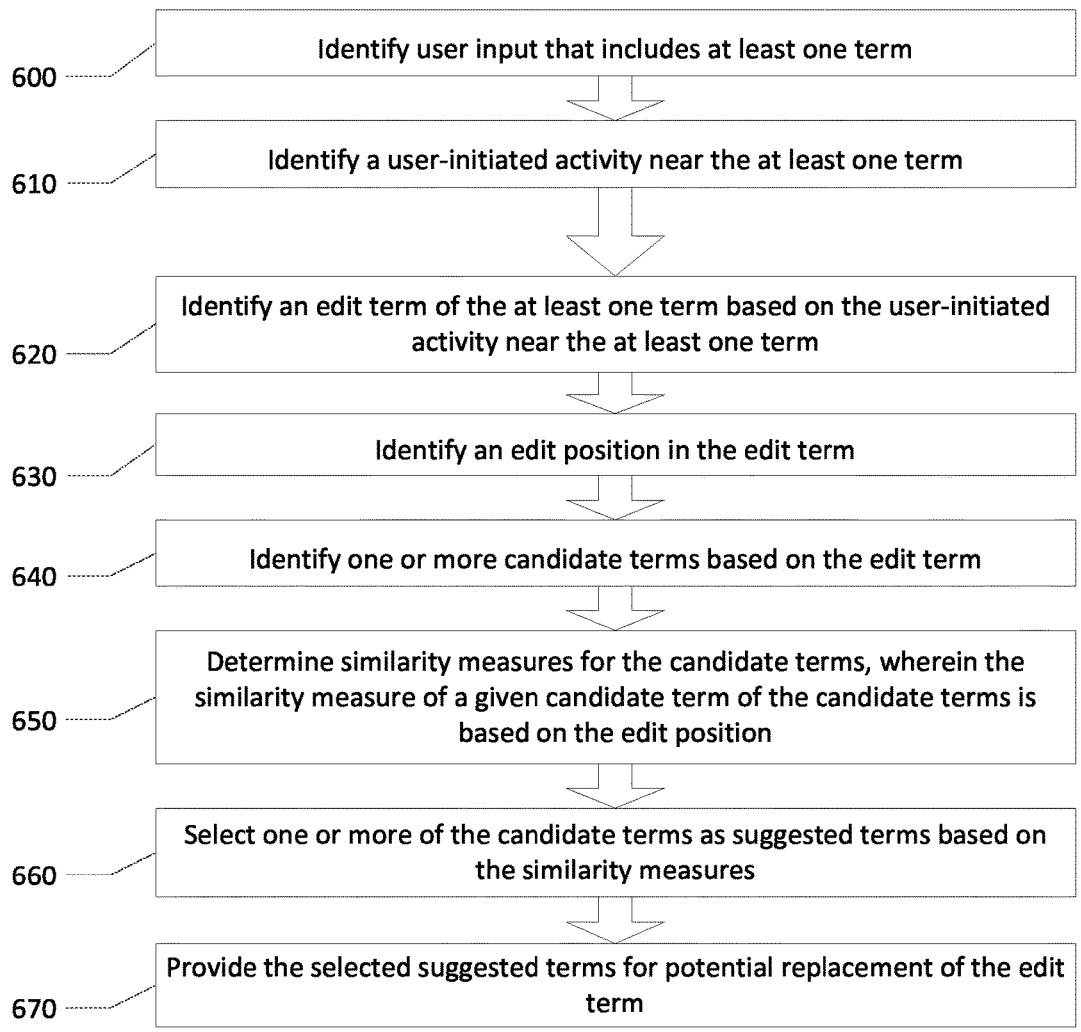
FIG. 6 is a flow chart illustrating an example method of identifying an edit term and providing suggested terms to replace the edit term.
Figure 7:
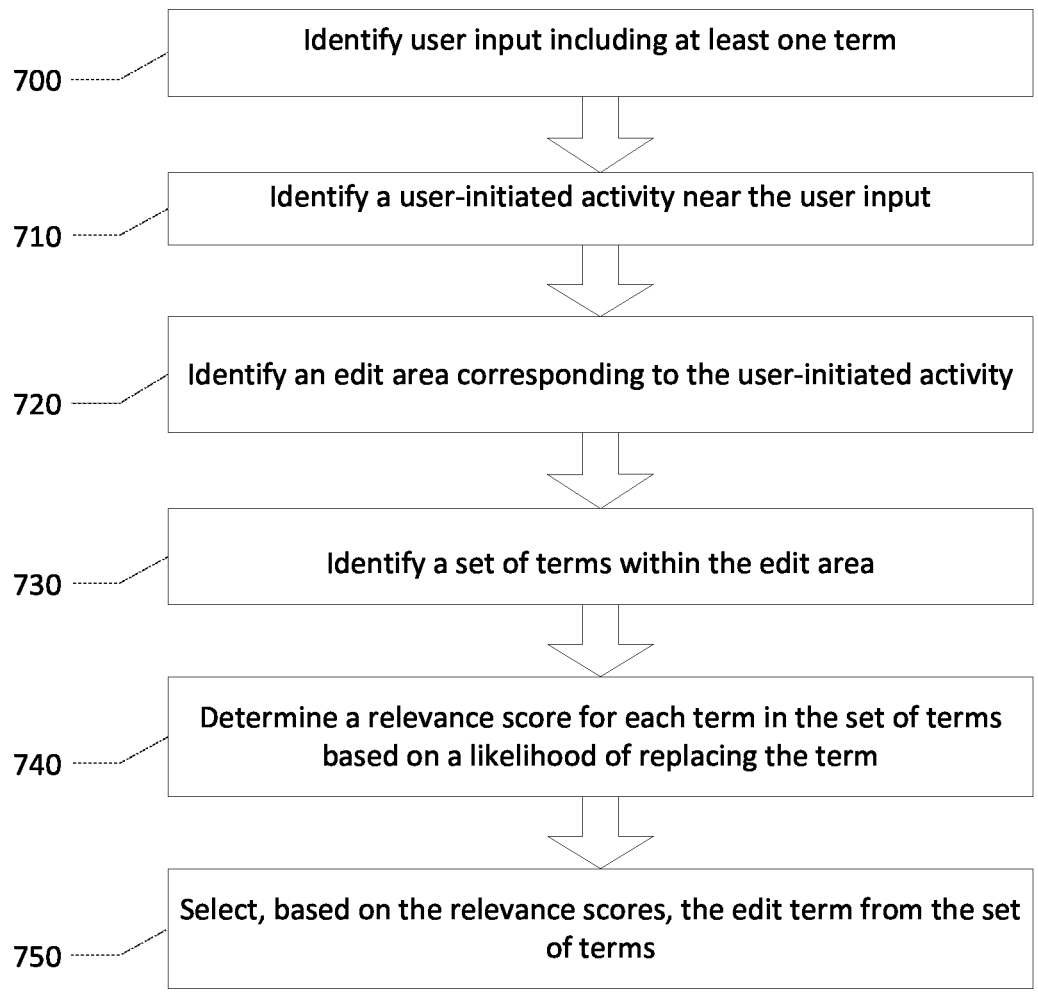
FIG. 7 is a flow chart illustrating an example method of identifying an edit term from an edit area.

In some implementations the computing device 110 may perform one or more of the steps of the methods of FIGS. 5, 6 and 7. The computing device 110 may be implemented in hardware, firmware, and/or software running on hardware. For example, computing device 110 may be implemented in one or more desktop computers, laptops, tablet devices, and/or smartphones.

Many other configurations are possible having more or less components than the environment shown in FIG. 1. For example, the content database 140 may be omitted. Also, for example, the edit term identification engine 120 and/or the term suggestion engine 150 and/or the ranking engine 130 may be combined. In some implementations, the term suggestion engine 150 and/or the ranking engine 130 may be omitted.

Referring to FIG. 6, a flow chart illustrates an implementation of identifying an edit term and providing suggested terms to replace the edit term. In some implementations, the steps may be performed in a different order; certain steps may be omitted; and/or different and/or additional steps than those illustrated in FIG. 6 may be performed. For convenience, aspects of FIG. 6 will be described with reference to a system of one or more computers that perform the process. The system may include, for example, the computing device 110 and/or the edit term identification engine 120, and/or the ranking engine 130, and/or the content database 140, and/or the term suggestion engine 150 of FIG. 1.

At step 600, user input that includes at least one term may be identified. For example, user may input the term "delver".

At step 610, user-initiated activity may be identified near the at least one term. For example, a user may point a selection device between "l" and "v" in the term "delver".

At step 620, an edit term of the at least one term may be identified based on the user-initiated activity near the at least one term. For example, the edit term may be the term at which the user-initiated activity was directed.

At step 630, an edit position in the edit term may be identified. The edit position may include one or more characters within the edit term; a position between two characters in the edit term; a position at the beginning of the edit term; a position at the end of the edit term; and/or a position near the edit term. The edit position may be identified based on the user-initiated activity. The edit position is a portion of the edit term that is likely to be modified when the edit term is replaced. The edit position may include one or more characters of the edit term. For example, the edit term may be identified as "delver" and the edit position may be identified as the position between "l" and "v". In some implementations this step may be performed by the edit term identification engine 120.

At step 640, one or more candidate terms may be identified based on the edit term. For example, the identified candidate terms may include "delve", "deliver", "delves", "delved", "delving", "delivers", "delivery", "delivered" and "delivering". In some implementations, this step may be performed by the term suggestion engine 150.

At step 650, a similarity measure for the candidate terms may be determined, where the similarity measure of a given candidate term of the candidate terms may be based on the edit position. The similarity measure for a candidate term may be based on one or more measures such as the semantic similarity score, the context-based matching score, the likelihood of co-occurrence of the edit term and the candidate term over a collection of documents, and statistical term frequencies. In some implementations the similarity measure may be adjusted based on an edit similarity score. For example, if the edit term is "delver", the identified candidate terms may include "delve", "deliver", "delves", "delved", "delving", "delivers", "delivery", "delivered" and "delivering". The edit similarity score between the edit term and each candidate term may be determined based on the edit position. For example, when the edit position is identified as the position between "l" and "v", the edit similarity scores for "delve", "delves", and "delved" may be set to zero since they do not differ from the edit term at the edit position. Accordingly, the similarity measures for "delve", "delves", and "delved" may be set to zero and these candidate terms may optionally not be provided as suggested terms. However, the edit similarity scores for "deliver", "delivers", "delivery" and "delivered" may be set to one based on the insertion of "i" in the edit position. Accordingly, the similarity measures for "deliver", "delivers", "delivery", "delivered" and "delivering" may remain unaltered. In some implementations this step may be performed by the term suggestion engine 150.

At step 660, one or more of the candidate terms may be selected as suggested terms based on the similarity measure.

In some implementations, the candidate terms may be ranked based on the similarity measure. For example, the ranking may be performed by the ranking engine 130 and the ranking engine 130 may provide the ranked candidate terms to the term suggestion engine 150. In some implementations the term suggestion engine 150 may determine that not all the ranked candidate terms are logical, useful, or valid suggestions. These candidate terms may optionally not be provided to the user.

At step 670, the selected suggested terms may be provided for potential replacement of the edit term. For example, the suggested terms may be presented to the user as, for example, described with reference to FIGS. 3A and 3B. The user may select a suggested term to replace the edit term.

Referring to FIG. 7, a flow chart illustrates another implementation of identifying an edit term and providing suggested terms to replace the edit term. In some implementations, the steps may be performed in a different order, certain steps may be omitted, and/or different and/or additional steps than those illustrated in FIG. 7 may be performed. For convenience, aspects of FIG. 7 will be described with reference to a system of one or more computers that perform the process. The system may include, for example, the computing device 110, the edit term identification engine 120, the ranking engine 130, the content database 140, and/or the term suggestion engine 150 of FIG. 1. The description of FIG. 5 may share one or more aspects in common with the description of FIG. 7.

At step 700, user input including at least one term may be identified. At step 710, a user-initiated activity near the user input may be identified. Steps 700 and 710 in this example may share one or more aspects in common with steps 600 and 610 of FIG. 6. In some implementations, an edit term and an edit position may not be identified based on user-initiated activity near the one or more terms. For example, in a touch-sensitive display, the user's finger touch may cover more than one term.

At step 720, an edit area corresponding to the user-initiated activity may be identified. For example, when a user touches the screen with a finger, the edit area may include the text in the area of the screen covered by the finger. In some implementations, if the user hovers over an area of the text using a mouse, or using a finger in a touch-sensitive display, the edit area may include text in the area covered by such hovering activity.

At step 730, a set of terms within the edit area may be identified. The identified edit area may include some terms that are partially included by the edit area. For example, in the text "our guarantee is that we can delver goods" the edit area may include "an delver". In such an instance, "can" and "delver" may be identified as the terms in the edit area.

At step 740, a relevance score may be determined for each term in the set of terms in the edit area. The relevance score for each term may be based on one or more factors including a likelihood of replacing the term. For example, if "can" and "delver" are identified as the terms in the edit area, then a relevance score more indicative of relevance may be assigned to "delver" than to "can" based on the higher likelihood that "delver" is a misspelled term.

At step 750, the edit term may be identified from the set of terms based on the relevance scores. For example, if "can" and "delver" are identified as the terms in the edit area, then a relevance score more indicative of relevance may be associated with "delver" than with "can" based on the likelihood that "delver" is the misspelled term. In such an instance, "delver" may be selected as the edit term.

In some implementations, the edit position may be identified after the edit term is identified, for example, as described in steps 610-620.

Figure 8:
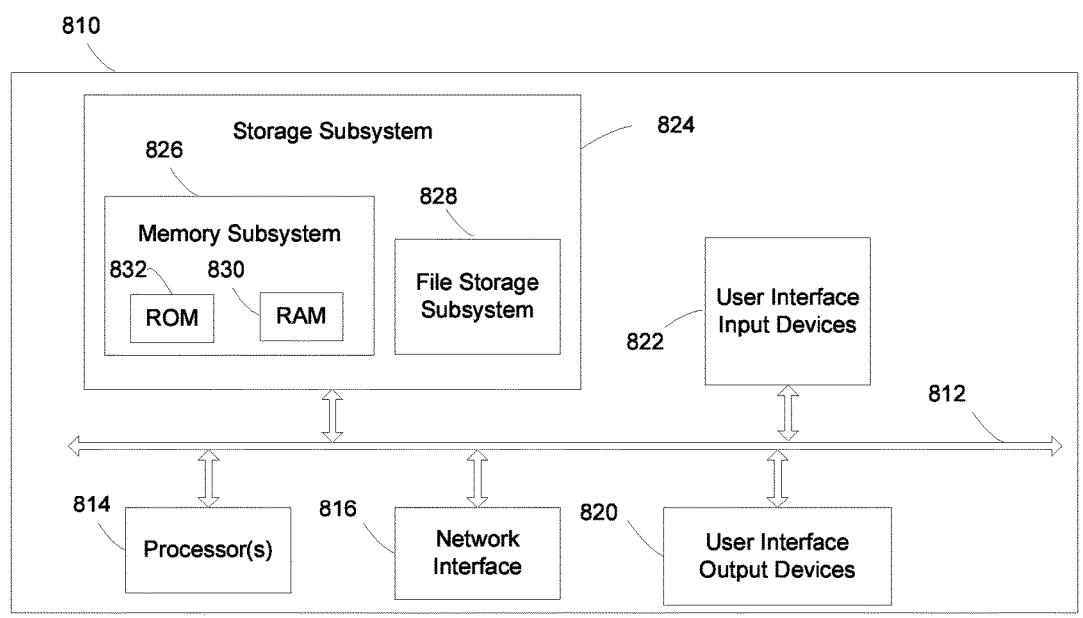
FIG. 8 illustrates a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 826 and a file storage subsystem 828, user interface input devices 822, user interface output devices 820, and a network interface subsystem 816. The input and output devices allow user interactivity with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to identify and/or transmit data related to identification of the edit term, the edit area, and/or the edit position as initiated by the user. The storage 824 may include the logic to identify and/or transmit data related to identification of candidate terms and suggested terms.

These software modules are generally executed by processor 814 alone or in combination with other processors. Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 828 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several inventive implementations have been described and illustrated herein, a variety of other means and/or structures for performing the function and/or obtaining the results and/or one or more of the advantages described herein may be utilized, and each of such variations and/or modifications is identified as to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i. e., elements that are conjunctively present in some cases and disjunctively present in other cases. Multiple elements listed with "and/or" should be construed in the same fashion, i. e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i. e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i. e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein in the specification and in the claims, the term "database" will be used broadly to refer to any collection of data. The data of the database does not need to be structured in any particular way, or structured at all, and it can be stored on storage devices in one or more locations. It should also be understood that, unless clearly indicated to the contrary, all data pertinent to users is appropriately anonymized.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i. e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111. 03.

What is claimed is:

1. A method implemented by one or more processors, comprising:
   identifying a term entered by a user at a client device, the term having a plurality of characters;
   detecting a first user-initiated activity directed at a first edit position in the term,
      wherein the first user-initiated activity is a touch at the first edit position via a touch-sensitive display of the client device, and
      wherein the first edit position is a first position between a first pair of the characters;
   determining, based on the first edit position and independent of additional user input of any additional characters to the edit term, a first group of candidate terms;
   providing the identified first group of candidate terms for display at the client device in response to the first user-initiated activity,
      wherein user selection of a given candidate term of the provided first group of candidate terms replaces the term with the given candidate term;
   detecting a second user-initiated activity directed at a second edit position in the term, the second edit position being distinct from the first edit position,
      wherein the second user-initiated activity is a touch at the second edit position via the touch-sensitive display of the client device, and
      wherein the second edit position is a second position between a second pair of the characters;
   determining, based on the second edit position and independent of additional user input of any additional characters to the edit term, a second group of candidate terms; and
   providing the identified second group of candidate terms for display at the client device in response to the second user-initiated activity,
      wherein user selection of a second given candidate term of the provided second group of candidate terms replaces the term with the second given candidate term, and
      wherein the given candidate term of the first group of candidate terms is not present in the second group of candidate terms.

2. The method of claim 1, wherein the second given candidate term of the second group of candidate terms is not present in the first group of candidate terms.

3. A client device, comprising:
   a touch-sensitive display;
   memory storing instructions; and
   one or more processors operable to execute the instructions stored in the memory to:
      identify a term entered by a user at the client device, the term having a plurality of characters;
      detect a first user-initiated activity directed at a first edit position in the term,
         wherein the first user-initiated activity is a touch at the first edit position via the touch-sensitive display of the client device, and
         wherein the first edit position is a first position between a first pair of the characters;
      determine, based on the first edit position and independent of additional user input of any additional characters to the edit term, a first group of candidate terms;
      provide the identified first group of candidate terms for display at the touch-sensitive display in response to the first user-initiated activity,
         wherein user selection of a given candidate term of the provided first group of candidate terms replaces the term with the given candidate term;
      detect a second user-initiated activity directed at a second edit position in the term, the second edit position being distinct from the first edit position,
         wherein the second user-initiated activity is a touch at the second edit position via the touch-sensitive display of the client device, and
         wherein the second edit position is a second position between a second pair of the characters;

determine, based on the second edit position and independent of additional user input of any additional characters to the edit term, a second group of candidate terms; and provide the identified second group of candidate terms for display at the touch-sensitive display in response to the second user-initiated activity, wherein user selection of a second given candidate term of the provided second group of candidate terms replaces the term with the second given candidate term, and wherein the given candidate term of the first group of candidate terms is not present in the second group of candidate terms.

4. The apparatus of claim 3, wherein the second given candidate term of the second group of candidate terms is not present in the first group of candidate terms.

5. A non-transitory computer-readable storage medium storing instructions that, when executed, cause one or more processors to perform a method, the method comprising:

identifying a term entered by a user at a client device, the term having a plurality of characters;

detecting a first user-initiated activity directed at a first edit position in the term, wherein the first user-initiated activity is a touch at the first edit position via a touch-sensitive display of the client device, and wherein the first edit position is a first position between a first pair of the characters;

determining, based on the first edit position and independent of additional user input of any additional characters to the edit term, a first group of candidate terms;

providing the identified first group of candidate terms for display at the client device in response to the first user-initiated activity, wherein user selection of a given candidate term of the provided first group of candidate terms replaces the term with the given candidate term;

detecting a second user-initiated activity directed at a second edit position in the term, the second edit position being distinct from the first edit position, wherein the second user-initiated activity is a touch at the second edit position via the touch-sensitive display of the client device, and wherein the second edit position is a second position between a second pair of the characters;

determining, based on the second edit position and independent of additional user input of any additional characters to the edit term, a second group of candidate terms; and providing the identified second group of candidate terms for display at the client device in response to the second user-initiated activity, wherein user selection of a second given candidate term of the provided second group of candidate terms replaces the term with the second given candidate term, and wherein the given candidate term of the first group of candidate terms is not present in the second group of candidate terms.

6. The non-transitory computer-readable storage medium of claim 5, wherein the second given candidate term of the second group of candidate terms is not present in the first group of candidate terms.

\* \* \* \* \*